United States Patent
Taylor et al.

(10) Patent No.: US 9,129,434 B2
(45) Date of Patent: Sep. 8, 2015

(54) METHOD AND SYSTEM FOR 3D SURFACE DEFORMATION FITTING

(76) Inventors: Robert R. Taylor, San Diego, CA (US); Michael J. McCormick, San Diego, CA (US); Colin J. Hodges, Burbank, CA (US); Michael Hutchinson, San Mateo, CA (US); Matthew S. Chapman, San Diego, CA (US); Matthew J. Schiller, San Diego, CA (US); Buddy Alverson, San Diego, CA (US)

( * ) Notice: Subject to any disclaimer, the term of this patent is extended or adjusted under 35 U.S.C. 154(b) by 221 days.

(21) Appl. No.: 12/156,027

(22) Filed: May 29, 2008

(65) Prior Publication Data
US 2009/0295793 A1  Dec. 3, 2009

(51) Int. Cl.
*G06T 13/20* (2011.01)

(52) U.S. Cl.
CPC ..................... *G06T 13/20* (2013.01)

(58) Field of Classification Search
USPC ................................. 345/473, 419
See application file for complete search history.

(56) References Cited

U.S. PATENT DOCUMENTS

| 7,202,869 B2 | 4/2007 | Tooley et al. |
| 2009/0066700 A1 | 3/2009 | Harding et al. |

OTHER PUBLICATIONS

Choe et al. "Analysis and Synthesis of Facial Expressions with Hand-Generated Muscle Actuation Basis" Proceedings of Computer Animation 2001, Nov. 2001, pp. 4-6.*
Bickel et al. "Multi-Scale Capture of Facial Geometry and Motion" In Proceedings of SIGGRAPH, 33, 2007, p. 3.*
Ruttkay et al. "Facial Animation by Synthesis of Captured and Artificial Data" Modelling and Motion Capture Techniques for Virtual Environments, Lecture Notes in Computer Science, 1998, p. 270.*

* cited by examiner

*Primary Examiner* — Maurice L McDowell, Jr.

(57) ABSTRACT

A method is provided for animating a three-dimensional object using an animation rig. An exemplary method according to the invention is a method that defines a positional relationship between the location of one or more known points on first surface and an equal number of corresponding points on a virtual surface, and a time interval. The time interval is incremented, and the positional offsets of one or more known points on the first surface are determined. The corresponding point or points on the virtual surface are then transformed by the positional offset, and the change in animation rig control values for the transformed points on the virtual surface are calculated. The animation rig control values are then updated based on said calculations.

7 Claims, 7 Drawing Sheets

METHOD AND SYSTEM FOR 3D SURFACE DEFORMATION FITTING

BACKGROUND OF THE INVENTION

1. Field of the Invention

The invention relates generally to the field of three-dimensional modeling of surfaces to create realistic computer generated images. In particular, the invention relates to a method and system for three-dimensional surface deformation fitting.

2. Description of Related Art

Three dimensional animation using computer generated images ("CGI") has evolved to take advantage of increased computing power, but still presents serious challenges in the creation of realistic depictions of complex geometries. The prior art methods and systems for modeling virtual surfaces have a limited ability to accurately model complex or subtle forms such as human faces. The resulting animations often are limited in their effectiveness in that they may not convincingly convey emotion, natural movement, or other effects appropriate to the particular animation. The present invention overcomes these limitations in the prior art, allowing for extremely accurate modeling that provides greater control and produces far more realistic animations.

SUMMARY OF THE INVENTION

A method is provided for animating a three-dimensional object using an animation rig. An exemplary method according to the invention is a method that defines a positional relationship between the location of one or more known points on an actual surface and an equal number of corresponding points on a virtual surface, and a time interval. The time interval is incremented, and the positional offsets of one or more known points on the actual surface are determined. The corresponding point or points on the virtual surface are then transformed by the positional offset, and the change in animation rig control values for the transformed points on the virtual surface are calculated. The animation rig control values are then updated based on said calculations.

In other more detailed features of the invention, the animation rig control values are updated in a sequence based on the relative significance of the movement being controlled. In other more detailed features of the invention, the positional offsets of said points on said actual surface comprise motion capture data. In other more detailed features of the invention, the positional offsets of said points on said actual surface comprise data from a second virtual surface. In other more detailed features of the invention, the sequence is repeated one or more times for each time increment. In other more detailed features of the invention, a normalized minimum to maximum range is established for each rig control to reflect the allowable deformation for said animation rig control in a single time increment. In other more detailed features of the invention, the amount of resulting deformation of the virtual surface is assumed to be linear within said minimum to maximum range. In other more detailed features of the invention, the amount of resulting deformation of the virtual surface is non-linear within said minimum to maximum range. In other more detailed features of the invention, non-linear deformation of the virtual surface is determined by subdividing said minimum to maximum range into multiple test states, and scoring each of said test states to establish the best correlation with the input translational data.

Another exemplary method according to the invention is a method that defines a positional relationship between the location of one or more known points on first surface and an equal number of corresponding points on a virtual surface, and a time interval. The time interval is incremented, and the positional offsets of one or more known points on the first surface are determined. The corresponding point or points on the virtual surface are then transformed by the positional offset, and the change in animation rig control values for the transformed points on the virtual surface are calculated. The animation rig control values are then updated based on said calculations.

In other more detailed features of the invention, the animation rig control values are updated in a sequence based on the relative significance of the movement being controlled. In other more detailed features of the invention, larger movements are updated before smaller movements. In other more detailed features of the invention, the positional offsets of said points on said first surface comprise data from a model. In other more detailed features of the invention, the sequence is repeated one or more times for each time increment. In other more detailed features of the invention, a normalized minimum to maximum range is established for each rig control to reflect the allowable deformation for said animation rig control in a single time increment. In other more detailed features of the invention, the amount of resulting deformation of the virtual surface is assumed to be linear within said minimum to maximum range. In other more detailed features of the invention, the amount of resulting deformation of the virtual surface is non-linear within said minimum to maximum range. In other more detailed features of the invention, said non-linear deformation of the virtual surface is determined by subdividing said minimum to maximum range into multiple test states, and scoring each of said test states to establish the best correlation with the input translational data.

DETAILED DESCRIPTION OF THE PREFERRED EMBODIMENTS

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Figure 1:
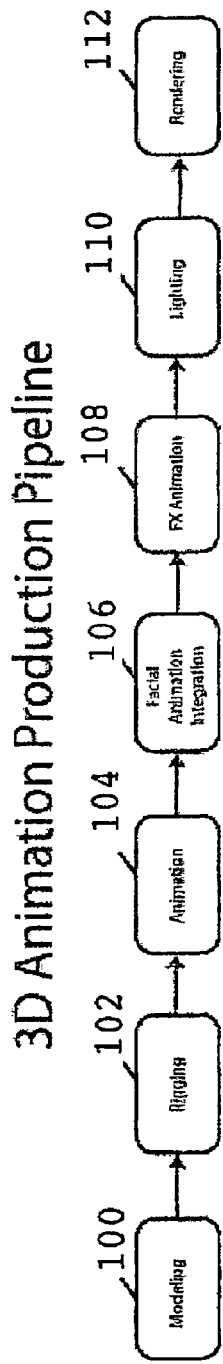
FIG. 1 is a block diagram showing an exemplary 3D animation production pipeline.

A three-dimensional ("3D") asset is the basic unit used in 3D animation production using computer generated images ("CGI"). A 3D asset typically includes a virtual surface description, animation rigs used to control deformation of that surface, rendered frames, data caches related to the 3D asset, and any other data necessary to make a 3D animated character or product. FIG. 1 illustrates a typical 3D animation production pipeline appropriate for use with the 3D surface deformation fitting method described here. The principal steps in this production pipeline are modeling 100, rigging 102, animation 104, animation integration 106, FX animation 108, lighting 110, and rendering 112.

Modeling 100 is the development of the virtual surfaces that represents the shape of the CGI character being created. As used herein, the term virtual refers generally to a digital representation of a real world attribute, quality, or object. Virtual surfaces may be defined using a variety of techniques. Some commonly used techniques include NURBS, T-Spline, H-Spline, polygon, and sub-divisional surface description. Any texture data surface descriptions necessary to define how the 3D asset will look when it is rendered are also generated during the modeling phase. The result of this process is a computer model of the CGI character in a neutral or undeformed state that is ready for rigging.

An animation rig is a control system used to deform a virtual surface. It is this surface deformation that makes a CGI character appear to move. In the rigging 102 step, an animation rig is developed that can be used by the animator to deform the virtual surface developed in the modeling 100 step. A neutral rig refers to the state of a rig when all of the controls are set to the default value, so that there is no deformation of the virtual surface controlled by the rig. A control state refers to the state of the rig when the virtual surface has been deformed by a rig. A rig may use a variety of different methods for controlling the deformation of the surface. Some common examples include bone-based systems, shape interpolation or morph-target systems, and procedural deformation systems.

Controls for the animation rig are typically expressed as single channel scalar values that feed input parameters to set the deformation state of the rig. More specifically, the animation rig controls are numerical floating point values that are input into the state machine that creates the mesh representing the virtual surface. Each animation rig control typically has a name that is used to identify the portion of the surface the controlled. For example, an animation rig used to deform a model of a human face might have controls for the "smile," "nose wrinkle," "eyelid," etc. Each animation rig control is manipulated using a standard interface, such as a graphical user interface like a slider bar or dial.

In the animation 104 step either an animator or an animation system manipulates the animation rig controls to create an animated performance. For complex CGI characters or other 3D assets this may require the use of several related models and animation rigs. For example, most characters require separate models for their body and face. Each model has its own animation rig and each is animated separately. In the animation integration 106 step, the performances of these two models are joined together to create a single 3D asset that contains both performances.

In the FX animation 108 step procedural or dynamic animation may be added to create special effects or bring greater detail to the animation. Some examples include the addition of particle effects, dynamic cloth movement, hair movement, fat jiggle, or muscle jiggle. In the lighting 110 step virtual lighting may be applied to the virtual surfaces of the models to create dramatic or technical effects such as shadowing. Both FX animation and lighting are optional steps that may not be appropriate or necessary for certain types of animation.

In the rendering 112 step, the final visual output or image is generated by the system. A variety of techniques well known in the art can be used to render the final images, including both hardware and software based rendering methods.

One of the most difficult aspects of creating powerful CGI characters is the portrayal of genuine emotion. Often refereed to as the "Uncanny Valley" of 3D computer graphics, the ability to convey emotion to an audience is the bridge to the psychological acceptance of a 3D CGI character by the audience. Faces are the primary means of establishing this emotional bridge, but the subtleties of even simple facial motion such as a small change in the position of an eyebrow, draw on complex relationships with other facial features that are extremely difficult to create or mimic with traditional methods of CGI animation.

The present invention is a system and method for controlling animation rigs to create 3D assets that move more naturally. While it will be described in the context of controlling a facial animation rig, the present invention is equally applicable to any complex 3D virtual surface to produced any desired animation effect.

Figure 2:
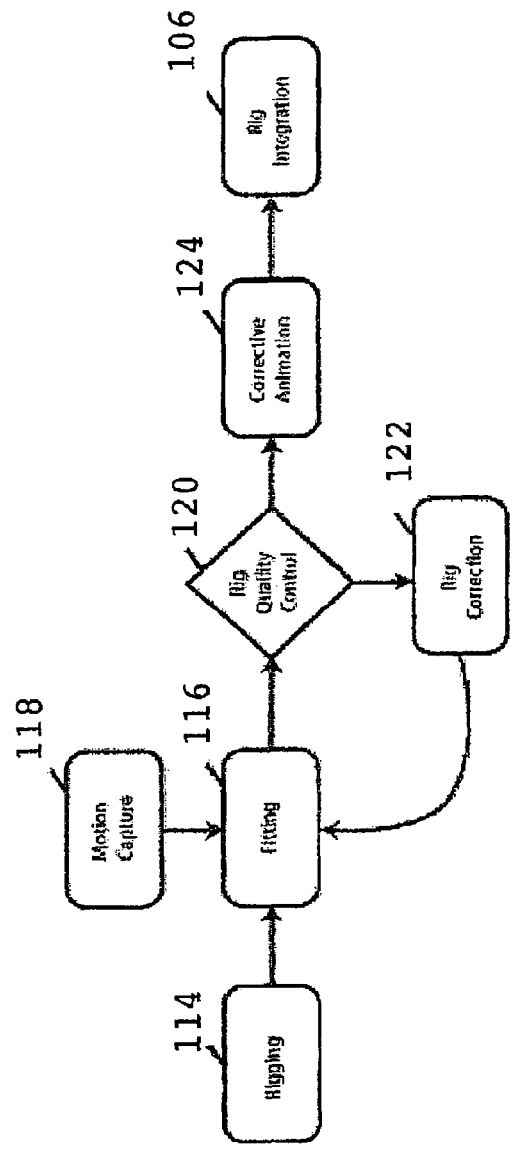
FIG. 2 is a block diagram showing an exemplary rigging and animation production pipeline.

FIG. 2 describes in more detail the rigging 102 and animation 104 steps in the 3D animation production pipeline where the 3D asset is relatively complex, such as in facial animation. Once a complex animation asset has been initially rigged 114, it is put through a data-fitting step 116 where motion capture data 118 is applied to the rigged asset to refine the animation rig. This process is sometimes referred to as retargeting.

Motion capture systems have been developed to help animators create animation rigs that will produce more natural movement. Motion capture systems typically use reflective markers or lights attached to an actor's body at key locations. Special cameras record the actor's movements from a variety of different angles as he or she moves on a special stage, capturing 3D data regarding the relative position of each marker at regular intervals. The interval time is typically referred to as a frame rate.

Motion capture systems use a variety of techniques to record the position of the markers, but the output data of every system is similar. The output data consists of a set of 3D positions in space for every marker in every frame that is captured. For example, a motion capture system might record the position of 200 markers on an actor at 30 frames-per-second. This means that a set of 200 3D coordinates is returned by the system 30 times per second. This 3D motion capture data is then used to improve the animation rig for the character being developed.

Once the motion capture data has been applied to the rig, it is tested to insure that the motion capture data has been properly integrated and that the resulting rig produces correct movement. As shown in FIG. 2, this testing may be referred to as rig quality control 120. Any necessary corrections are then made to the rig 122 so that the virtual surface accurately reflects the actual surface. Once the rig passes quality control, the resulting animation can be further refined and adjustments can be made to the existing controls, or new controls can be added, to correct the animation 124. The final rig and corrected animation can then move to the rig integration 106 step.

The animation rig developed through this process is critical to the creation of realistic 3D assets, since it is the animation rig that is used to control the virtual surface. One of the challenges in creating an animation rig that effectively controls the virtual surface is that motion capture systems can only capture a limited number of marker points, such that even sophisticated systems produce relatively sparse data samples. Given such sparse positional data, prior art systems for using motion capture data have focused on directly driving the animation rigging controls with the motion capture data, or using video footage via computer vision techniques to develop a best fit solution.

The present invention instead measures the actual relative change on the actual surface and compares it to the change on the virtual surface controlled by the animation rig. This approach faithfully tracks the deformation of a complex dynamic actual surface, and uses the resulting translational data to drive the deformation of a complex 3D virtual surface.

The translational data used to control the animation rig can originate from any source that will output translational points in space, such as a motion capture system. Translational data may also be derived from existing virtual 3D surfaces, or by utilizing photogrammetry or other computer vision techniques. The only requirement is that the measured relative positions on the source deforming object must be temporally coherent and must be measured from the same relative position on the surface over the course of the performance.

The animation rig controls are grouped in hierarchical order based on the importance of the deformation that is being controlled. This hierarchy defines the order in which the rig controls are calculated. In general, controls that generate larger movements will be higher in the hierarchy than controls that generate smaller movements. For instance, on a facial animation rig, jaw movements will usually be calculated prior to smaller chin or lip movements. A normalized minimum to maximum range is established for each rig control to reflect the minimum and maximum allowable deformation for that control in a single time increment. The amount of resulting surface deformation is assumed to be linear within this minimum to maximum range. A non-linear relationship between the rig control and the amount of surface deformation can be accommodated by subdividing the minimum to maximum range into multiple test states, and scoring each test state to establish the best correlation with the input translational data.

Figure 3:
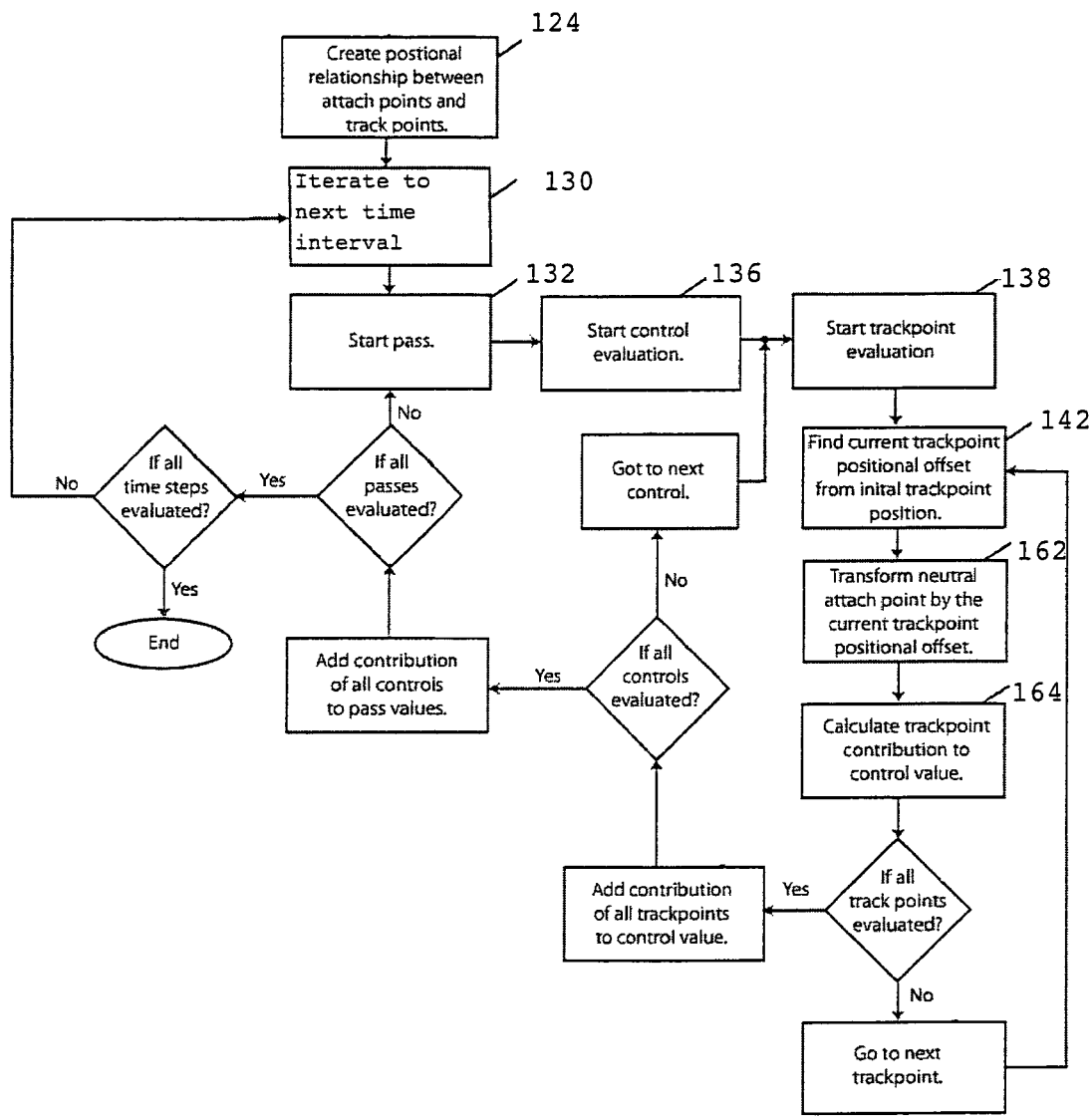
FIG. 3 is a block diagram showing an exemplary surface deformation process.
Figure 4:
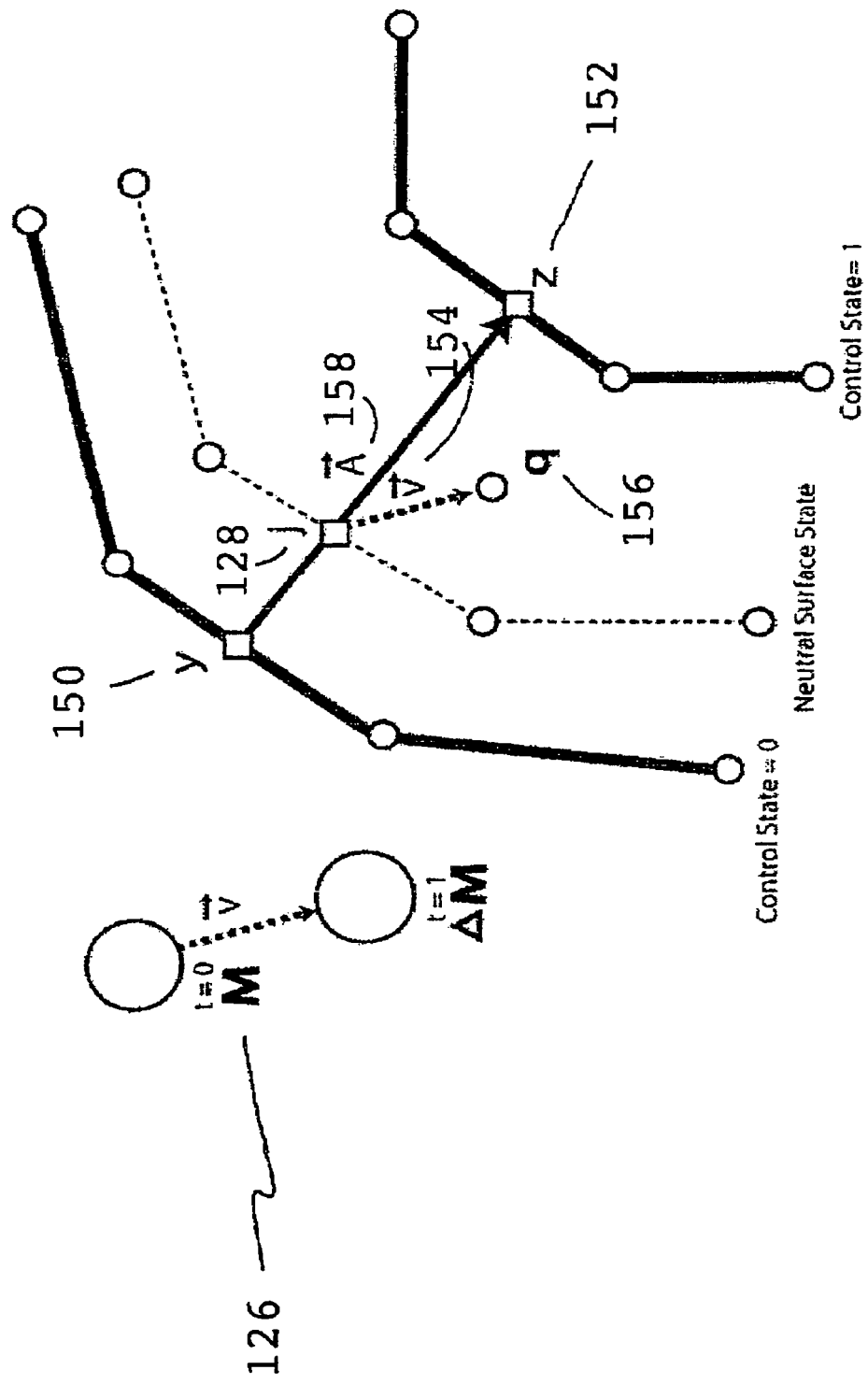
FIG. 4 is an illustration showing an exemplary relationship between track points and attach points.

Referring to FIG. 3, the first step 124 in the rigging and animation process is to define a positional relationship between points on the actual surface reflected by the input translational data and associated points on the virtual surface. These points on the actual and virtual surfaces will be referred to herein as track points M and attach points j respectively. Referring to FIG. 4, track points M 126 are the points on the actual surface reflected by the input translational data from the motion capture or other system. Attach points j 128 are the associated user-defined points on the virtual surface when the rig is in a neutral surface state. Once it is defined, the positional relationship between the track points M and attach points j is then stored for use in the deformation modeling process.

The time state t in animation is typically defined as frames or fractions of seconds. Once the time state t, track points M, and associated attach points j have been defined, the time state is iterated to the next interval 130 and a surface deformation pass is started 132. A surface deformation pass consists of one cycle through all of the controls for the current time state of the system. Because the rig controls have a specific order of evaluation it is advantageous to run multiple surface deformation passes for each time state in order to allow rig controls that are lower in the hierarchy to have an effect on rig controls that are higher in the hierarchy. Multiple surface deformation passes also move the system towards stability. After three or four surface deformation passes there is usually little or no change in the resulting rig control values. Once a set of surface deformation passes is completed, the time state is again iterated to the next interval and the next set of surface deformation passes begins. This process continues until all time states have been completed. The resulting output is a set of values for each rig control for each time interval.

Figure 6:
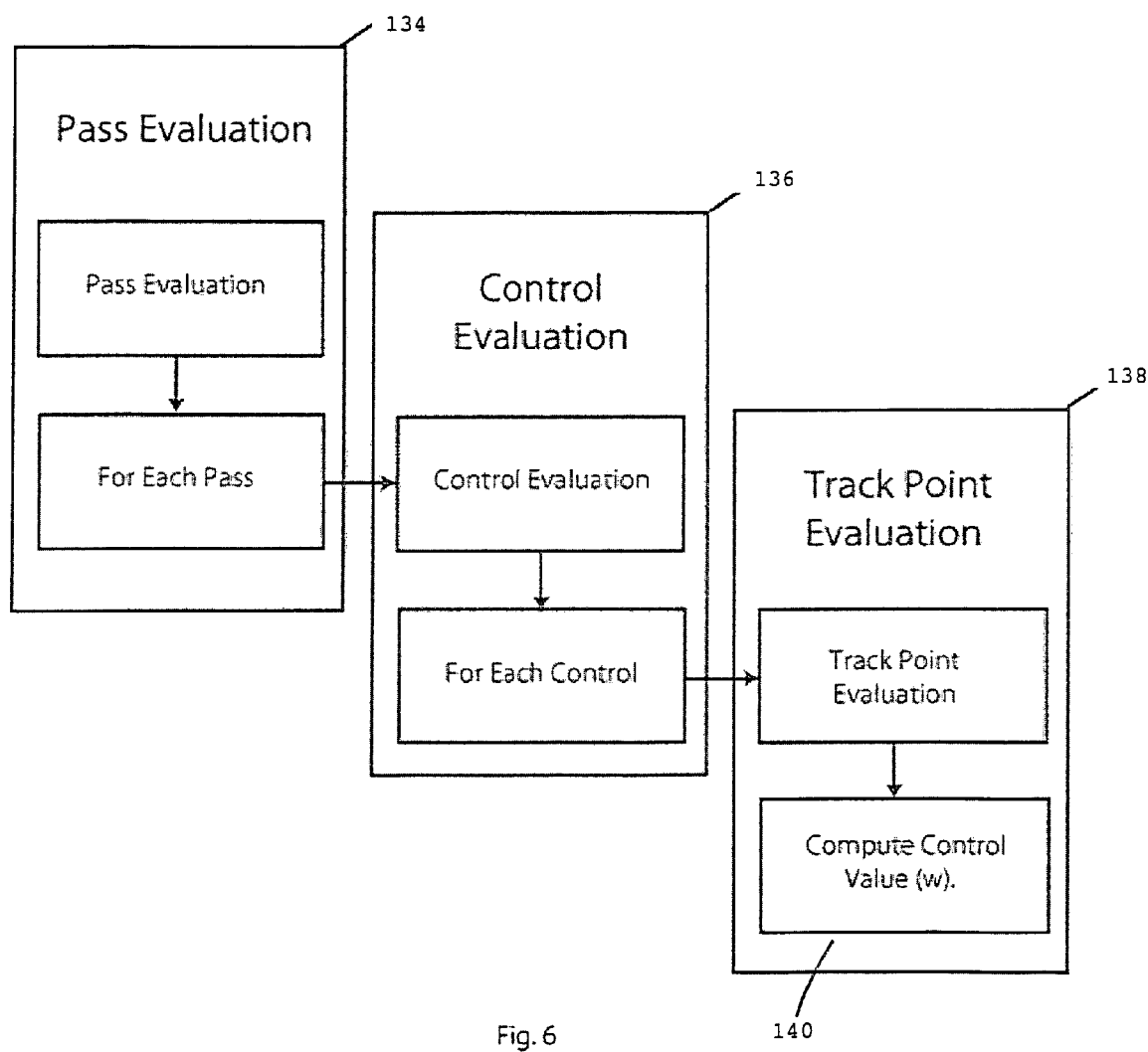
FIG. 6 is a block diagram showing an exemplary pass evaluation process.

Referring to FIG. 6, in an embodiment of the present invention the control state of the animation rig for a time interval t is calculated using a three-level recursive algorithm. The three levels of evaluation are: (1) surface deformation pass evaluation 134; (2) rig control evaluation 136; and (3) track point evaluation 138. The surface deformation pass evaluation consists of a single iteration through all of the rig controls at the current time state t of the system. To avoid one rig control canceling out the contribution of the other rig controls, the state of the control rig is set at the end of the surface deformation evaluation pass, rather than after each control state value (w) 140 is calculated. As noted above, this allows multiple iterations of the rig control evaluation that bring the system into a stable state for the time interval before the contribution of all rig control values is added.

Each rig control evaluation 136 requires a full iteration through all of the track points that affect the virtual surface that is being deformed. After each rig control value is calculated, that value is stored until all controls have been calculated. Once all of the rig control values have been calculated, the control state for the rig is updated and the next surface deformation pass evaluation 134 begins.

The track point evaluation 138 is used to calculate the actual individual control value (w) 140 for each track point at the current time interval. By comparing the translation of the motion capture track point data to the translation of the associated point on the surface, the optimal control state value (w) can be determined.

Figure 7:
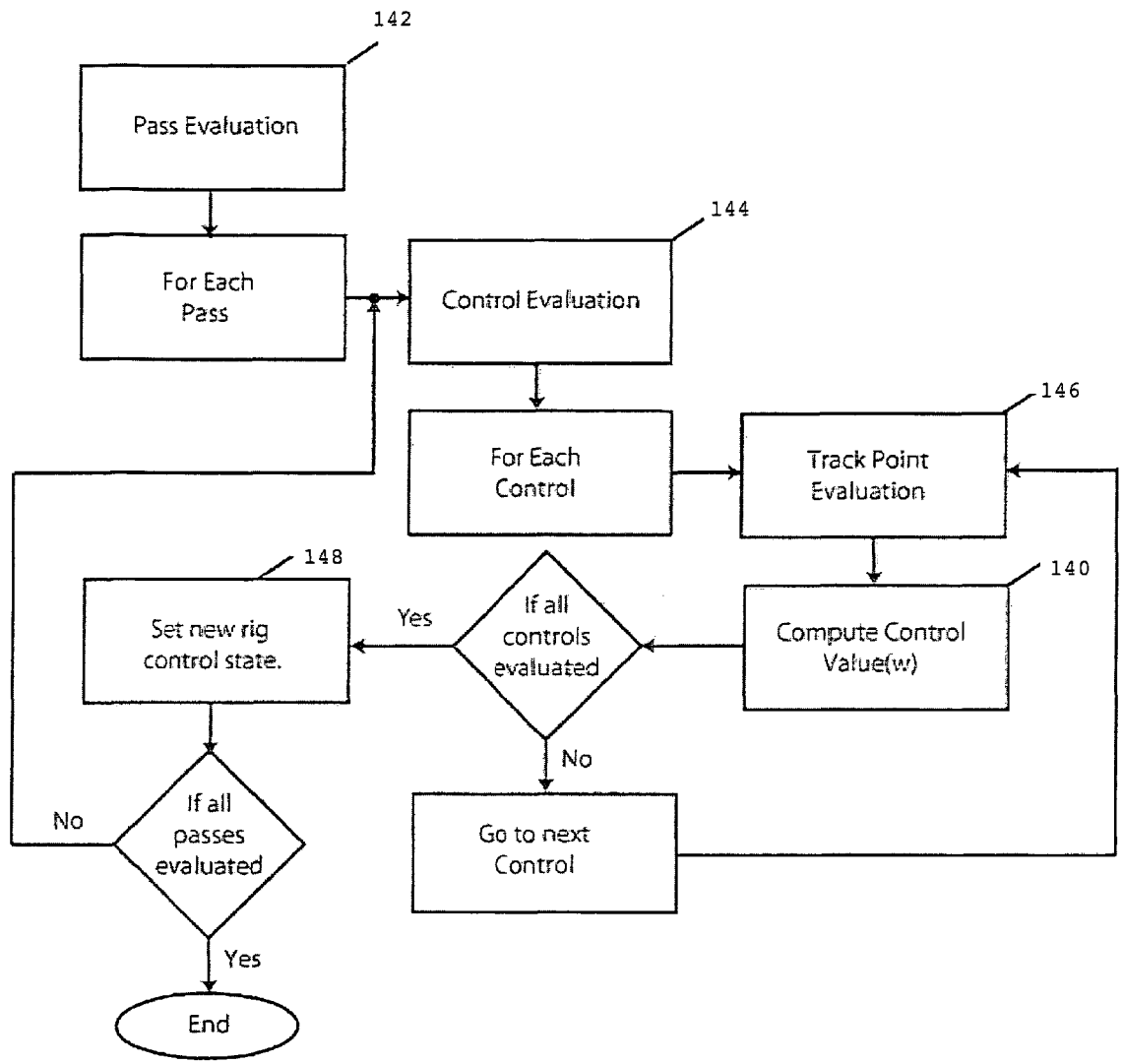
FIG. 7 is a block diagram showing an exemplary rig control evaluation process.

Referring to FIG. 7, an embodiment of the present invention using the previously discussed three-level recursive algorithm is described in more detail. After the current time state t has been defined, a pass evaluation 142 can begin. For each pass requested, all of the relevant rig controls must be evaluated. The rig control evaluation 144 includes track point evaluation 146 for each rig control. Each track point evaluation produces a new control value (w) 140 for that rig control. This process is repeated until a new control value (w) for each rig control has been solved. After all the control values (w) have been calculated, the control state for the rig is set 148. If the selected number of evaluation passes has been completed for the current time state, the next evaluation pass begins using the new control state as the neutral control value for the animation rig.

Figure 5:
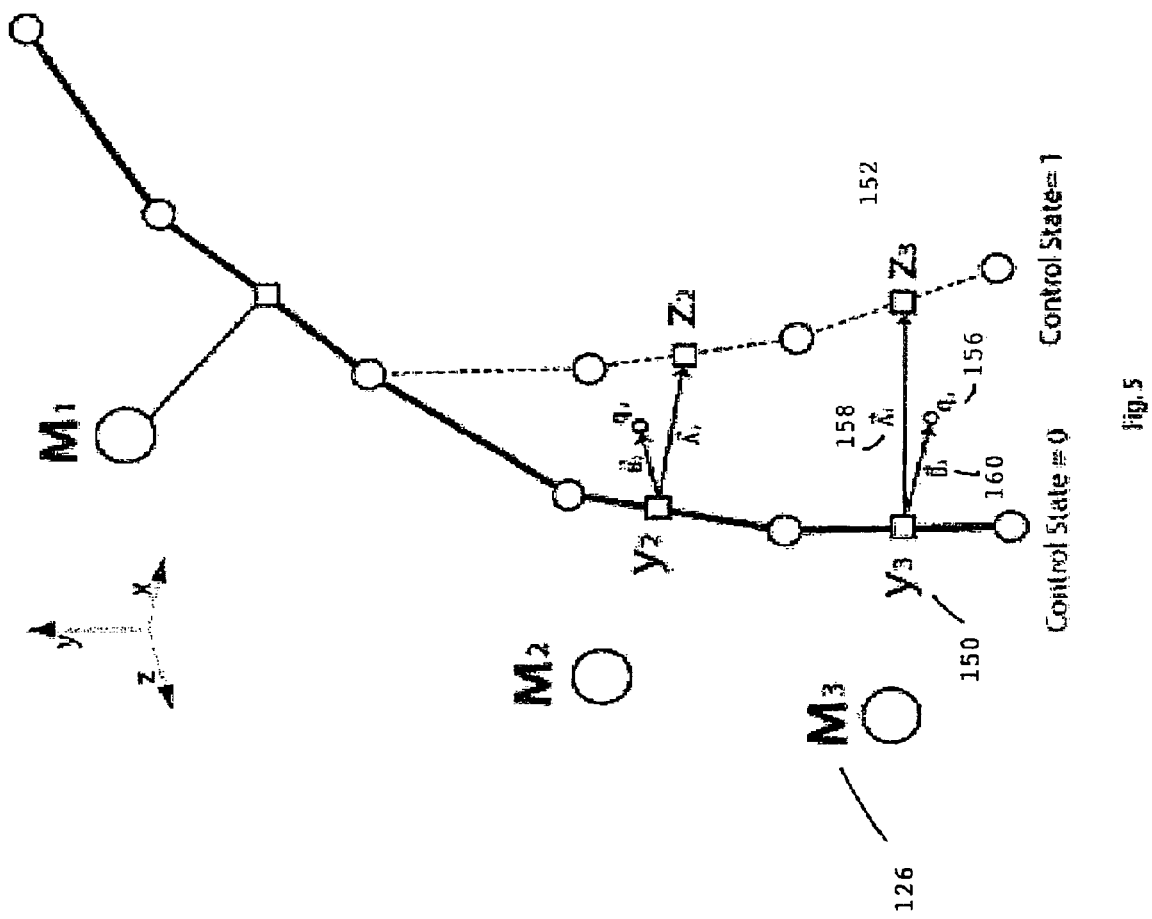
FIG. 5 is an illustration showing an exemplary set of control states for an animation rig control.
Figure 8:
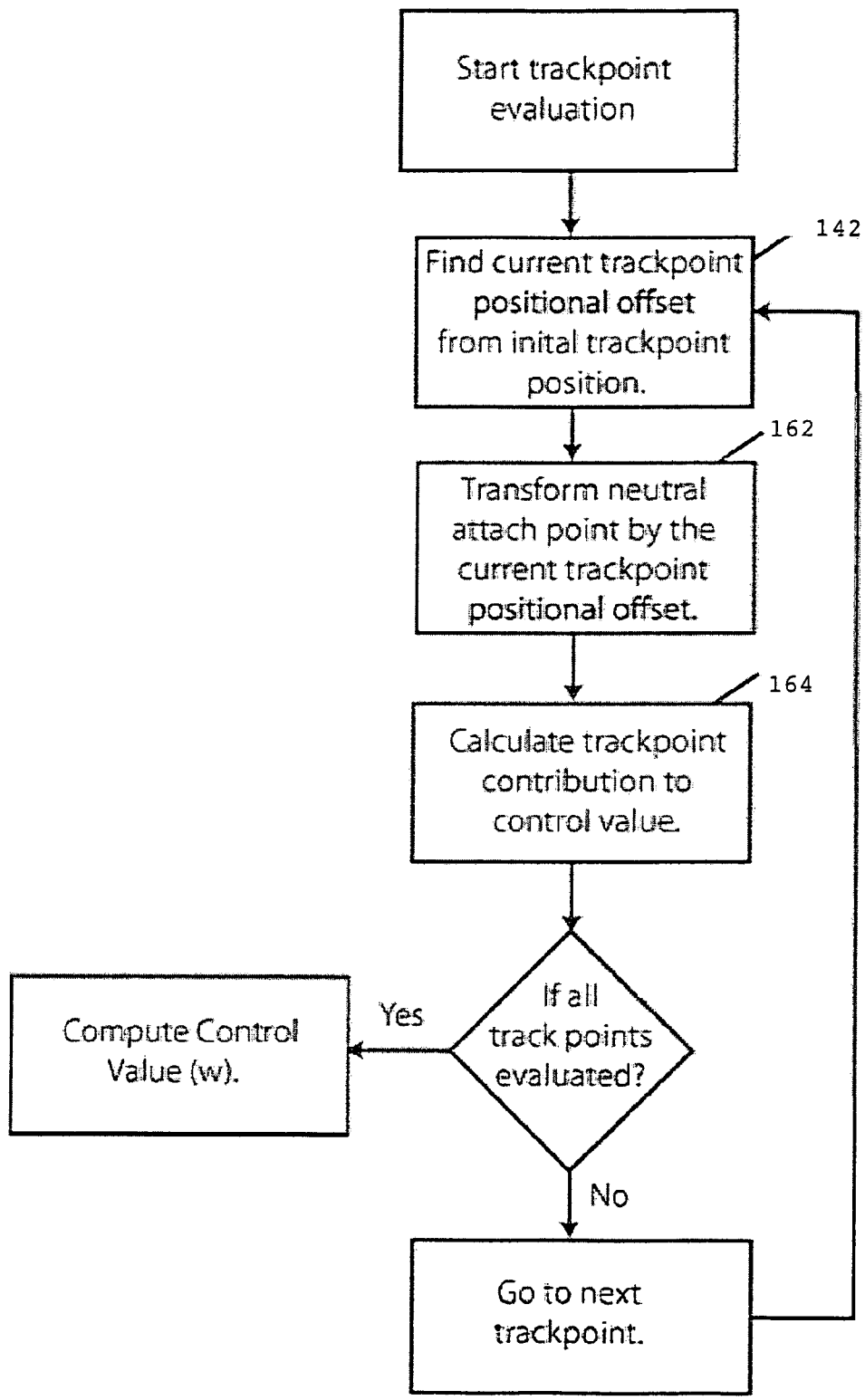
FIG. 8 is a block diagram showing an exemplary track point evaluation process.

Referring to FIGS. 4, 5, and 8, an exemplary process for conducting the track point evaluation is disclosed in more detail. For each rig control, the track points M 126 that affect the region deformed by that control are individually tested against the minimum and maximum values of that rig control. Attach point j 128 is the associated attach point for track point M 126 in a neutral, or un-deformed, state. The deformed state of the virtual surface when the applicable rig control is set to its minimum value is referred to as control state 0. The deformed state of the virtual surface when the applicable rig control is set to its maximum value is referred to as control state 1. The attach point offset values y 150 and z 152 are defined as the offsets of the attach point j for the minimum and maximum rig control states 0 and 1 respectively.

Once the control states have been established, the first step in the track point evaluation process is to find the positional offset of each track point M 126 from its initial position prior to the time increment. This positional offset is determined directly from the translational data, and reflects the change in position of that track point M on the actual surface between t=0 and t=1. This positional offset is calculated as track point offset vector V 154.

The next step is to transform the neutral attach point j 128 by the positional offset 162. To do this, the track point offset vector V 154 is applied to the neutral value of the associated attach point j to determine the control test position q 156.

The next step is to calculate the track point contribution to the rig control value (w) 164. To do this, once control test position q 156 has been determined, two additional attach point vectors are calculated for each track point M 126. The first attach point vector A 158 is calculated for the distance between the attach point offset values y 150 and z 152, which reflect minimum and maximum control states 0 and 1. The second attach point vector B 160 is calculated for the distance between the attach point offset value y and the control test position q. This process is repeated until control test position q and attach point vectors A and B have been calculated for each track point M that affects a given rig control.

Once all of the track points M 126 for a given rig control have been evaluated that track point evaluation pass is complete, and the state of the rig control value (w) for that rig control is calculated. The state of the rig control value (w) is defined by the equation:

$$w = \frac{\sum_{i=0}^{n} \vec{A_i} \cdot \vec{B_i}}{\sum_{i=0}^{n} \vec{A_i} \cdot \vec{A_i}}$$

If the solved state of the rig control value (w) is outside the values of control state 0 or control state 1, it is clamped so that it falls within the control state range. The calculated rig control value (w) is then added to the neutral value for that rig control, and the new value is the control state for that rig control. The rig control evaluation process is then repeated for each control in the rig in hierarchical order. Once all of the rig controls have been evaluated, the contribution of all the rig controls is added to the control state for the animation rig and that pass is complete.

If there are any additional passes to be calculated, the new control state of the rig is used as the neutral state for the next pass. Once all evaluation passes are calculated for a given time step the pass evaluation process is complete. If there is another time step, the next time step is iterated to and the control values for the new time step are solved. This process continues until all time steps have been completed.

Once all of the time steps have been completed, the rig control values are set such that the virtual surface will closely match the actual surface at each time step. If the surface that is being modeled is a face, the facial expression of the CGI character will closely match the facial expression of the actor that was the subject of the motion capture. The result is a highly realistic CGI model of the actual surface, or other input source.

What is claimed is:

1. A method of animating a three-dimensional object using an animation rig, the method comprising:
    defining a positional relationship between the location of one or more known points on an actual surface and an equal number of corresponding points on a virtual surface;
    defining a time interval;
    incrementing said time interval;
    determining the positional offsets of said one or more known points on said actual surface;
    transforming the corresponding point or points on said virtual surface by said positional offsets;
    calculating the change in the animation rig control values for said transformed points on said virtual surface; and
    updating said animation rig control values based on said calculations;
    wherein said animation rig control values are updated in a sequence based on the relative significance of the movement being controlled; and
    wherein a normalized minimum to maximum range is established for each rig control to reflect the allowable deformation for said animation rig control in a single time increment.

2. The method of claim 1, wherein the positional offsets of said points on said actual surface comprise motion capture data.

3. The method of claim 1, wherein the positional offsets of said points on said actual surface comprise data from a second virtual surface.

4. The method of claim 1, wherein said sequence is repeated one or more times for each time increment.

5. The method of claim 1, wherein the amount of resulting deformation of the virtual surface is assumed to be linear within said minimum to maximum range.

6. The method of claim 1, wherein the amount of resulting deformation of the virtual surface is non-linear within said minimum to maximum range.

7. The method of claim 6, wherein said non-linear deformation of the virtual surface is determined by subdividing said minimum to maximum range into multiple test states, and scoring each of said test states to establish the best correlation with the input translational data.

* * * * *